United States Patent [19]
Nozaki et al.

[11] Patent Number: 5,863,275
[45] Date of Patent: Jan. 26, 1999

[54] APPARATUS FOR INCREASING VEHICLE ENGINE OUTPUT UPON SHIFT-DOWN ACTION OF AUTOMATIC TRANSMISSION DEPENDING UPON VEHICLE DECELERATION

[75] Inventors: Yoshinobu Nozaki, Anjo; Kunihiro Iwatsuki, Toyota, both of Japan

[73] Assignee: Toyota Jidosha Kabushiki Kaisha, Toyota, Japan

[21] Appl. No.: 902,948

[22] Filed: Jul. 30, 1997

[30] Foreign Application Priority Data

Jul. 30, 1996 [JP] Japan .................................. 8-200593

[51] Int. Cl.$^6$ .......................... B60K 41/06; F16H 61/04; F02D 29/02
[52] U.S. Cl. ........................................... 477/110; 477/107
[58] Field of Search .................... 477/107, 110, 477/111

[56] References Cited

U.S. PATENT DOCUMENTS

| | | |
|---|---|---|
| 5,079,970 | 1/1992 | Butts et al. .............................. 477/110 |
| 5,133,227 | 7/1992 | Iwatsuki ................................... 477/111 |
| 5,146,891 | 9/1992 | Nakazawa et al. ...................... 477/107 |
| 5,428,531 | 6/1995 | Hayafune ................................ 477/107 |
| 5,577,979 | 11/1996 | Iizuka ....................................... 477/11 |
| 5,613,920 | 3/1997 | Uno et al. ................................ 477/110 |

FOREIGN PATENT DOCUMENTS 63-284039  11/1988  Japan .
6-17673  1/1994  Japan .

*Primary Examiner*—Dirk Wright
*Attorney, Agent, or Firm*—Oblon, Spivak, McClelland, Maier & Neustadt, P.C.

[57] ABSTRACT

An apparatus for controlling an automotive vehicle having an engine whose output is controllable independently of an accelerator pedal operation. The apparatus including an engine output increasing device for temporarily increasing the engine output upon a shift-down action of an automatic transmission during vehicle deceleration. An engine output increase amount determining device is provided for determining an amount of increase of the engine output by the engine output increasing device on the basis of a deceleration value of the vehicle and according to a predetermined relationship between the engine output increase amount and the vehicle deceleration value.

8 Claims, 8 Drawing Sheets

FIG. 4

| SHIFT LEVER | AUTOMATIC TRANSMISSION | $C_0$ | $C_1$ | $C_2$ | $B_0$ | $B_1$ | $B_2$ | $B_3$ | $F_0$ | $F_1$ | $F_2$ | $S_1$ | $S_2$ |
|---|---|---|---|---|---|---|---|---|---|---|---|---|---|
| P | PARKING | ○ | | | | | | | | | | ○ | |
| R | REVERSE | ○ | | ○ | | | | ○ | | | | ○ | |
| N | NEUTRAL | ○ | | | | | | | | | | ○ | |
| D | 1st | ○ | ○ | | | | | | | | | ○ | |
| D | 2nd | ○ | ○ | | | | ○ | | ○ | | ○ | ○ | ○ |
| D | 3rd | ○ | ○ | ○ | | | ○ | | ○ | ○ | | | ○ |
| D | 4th (O/D) | | ○ | ○ | ○ | | ○ | | ○ | | | | |
| 2 | 1st | ○ | ○ | | | ○ | ○ | | ○ | | | ○ | |
| 2 | 2nd | ○ | ○ | | | | ○ | | ○ | | ○ | ○ | ○ |
| 2 | 3rd | ○ | ○ | ○ | | | | | ○ | ○ | | | ○ |
| L | 1st | ○ | ○ | | | ○ | ○ | | ○ | | ○ | ○ | |
| L | 2nd | ○ | ○ | | | | | | ○ | ○ | | ○ | ○ |

FIG. 6

Vdcst 1 (%)

| ΔNO (r.p.m./s) | NE/NT | | | | | |
|---|---|---|---|---|---|---|
| | 1.0 | 1.2 | 1.4 | 1.6 | 2.0 | 2.2 |
| $\alpha_1 \sim \alpha_2$ | $\beta_1$ | → | DECREASING | → | → | $\beta_2$ |
| $\alpha_2 \sim \alpha_3$ | DECREASING | DECREASING | | | | DECREASING |
| $\alpha_3 \sim \alpha_4$ | | | DECREASING | | | |
| $\alpha_4 \sim$ | $\beta_3$ | | DECREASING | | → | $\beta_4$ |

$0 \leq \alpha_1 < \alpha_2 < \alpha_3 < \alpha_4$   $0 \leq \beta_4 < \beta_2, \beta_3 < \beta_1$

FIG. 7

| THO (°C) | -20 | 0 | 20 | 40 | 60 | 80 |
|---|---|---|---|---|---|---|
| Vdcst 2 (%) | $\gamma_1$ | | DECREASING | | → | $\gamma_2$ |

$0 \leq \gamma_2 < \gamma_1$

FIG. 8

| ΔNO (r.p.m./s) | $\alpha_1$ | $\alpha_2$ | $\alpha_4$ |
|---|---|---|---|
| KNO (r.p.m.) | $\rho_1$ | INCREASING → | $\rho_2$ |

$0 \leq \rho_1 < \rho_2$

APPARATUS FOR INCREASING VEHICLE ENGINE OUTPUT UPON SHIFT-DOWN ACTION OF AUTOMATIC TRANSMISSION DEPENDING UPON VEHICLE DECELERATION

BACKGROUND OF THE INVENTION

1. Field of the Invention

The present invention relates in general to an apparatus for controlling an automotive vehicle having an engine and an automatic transmission, and more particularly to techniques for temporarily increasing an output of the engine upon a shift-down action of the automatic transmission during deceleration of the vehicle.

2. Discussion of the Related Art

An automotive vehicle is known wherein the output of an engine is controllable independently of an operation of an accelerator pedal, and an automatic transmission is automatically shifted to a selected one of a plurality of operating positions having respective different speed ratios, depending upon a running condition of the vehicle. For this type of automotive vehicle, there has been proposed a control apparatus adapted to increase the engine output upon a shift-down action of the automatic transmission during running of the vehicle in a decelerating state with the accelerator pedal placed in its non-operated position, so that an engine braking force produced as a result of the shift-down action is reduced so as to mitigate a shifting shock of the automatic transmission and improve the driving comfort of the vehicle. An example of such a vehicle control apparatus is disclosed in JP-A-63-284039.

The known vehicle control apparatus of the type described above uses an idling speed control valve (ISC valve) to increase the engine output upon a shift-down action of the automatic transmission, by increasing the idling speed of the engine while the accelerator pedal is placed in the non-operated position. The ISC valve is activated in response to an engine output increasing command which is generated when the apparatus determines that the automatic transmission should be shifted down during the vehicle deceleration. There exists a time delay between the moment of generation of the engine output increasing command and the moment of actual increase of the engine output by activation of the ISC valve. However, the amount of increase of the engine output by activating the ISC valve is not determined with the time delay taken into account. Consequently, the known apparatus does not necessarily permits a required amount of increase of the engine output upon engagement and/or disengagement of appropriate frictional coupling devices which are used to achieve the shift-down action of the automatic transmission. Therefore, the known apparatus is not capable of sufficiently reducing the shifting shock of the automatic transmission.

In the known vehicle control apparatus, the amount of increase of the engine output, namely, the amount of operation of the ISC valve during a shift-down action of the automatic transmission is determined so that an actual value of an input shaft speed Nx of the automatic transmission after the shift-down action coincides with an target or desired value which is estimated on the basis of the running speed of the vehicle (output shaft speed of the automatic transmission) during the deceleration, and the speed ratio of the operating position of the automatic transmission which is established by the shift-down action. The running speed of the vehicle at which the frictional coupling devices are operated to achieve the shift-down action of the automatic transmission varies depending upon the deceleration value of the vehicle, which is influenced by the gradient of the road surface and the operating state of a vehicle braking system (depending upon whether the braking system is operated or not, and depending upon the braking force acting on the vehicle), even if the amount of operation of the ISC valve is determined at the same vehicle running speed. Therefore, the known apparatus does not assure a suitable amount of increase of the engine output at the time of operation of the frictional coupling devices to achieve the shift-down action of the automatic transmission.

SUMMARY OF THE INVENTION

It is therefore an object of the present invention to provide an automotive vehicle control apparatus capable of effectively minimizing a shifting shock of the automatic transmission upon a shift-down action thereof during deceleration of the vehicle, by suitably increasing the engine output at an appropriate timing with respect to the shift-down action.

The above object may be achieved according to the principle of the present invention, which provides an apparatus for controlling an automotive vehicle having an engine whose output is controllable independently of an operation of an accelerator pedal, and an automatic transmission having a plurality of operating positions which are selectively established, the apparatus comprising: (a) engine output increase amount determining means for determining an amount of increase of an output of the engine upon a shift-down action of the automatic transmission during deceleration of the vehicle, on the basis of a deceleration value of the vehicle and according to a predetermined first relationship between the amount of increase of the output of the engine and the deceleration value of the vehicle; and (b) engine output increasing means for temporarily increasing the output of the engine by the amount of increase determined by the engine output increase amount determining means, upon the shift-down action of the automatic transmission during deceleration of the vehicle.

In the present vehicle control apparatus, the amount of increase of the engine output is determined by the engine output increase amount determining means on the basis of the actual deceleration value of the vehicle and according to the predetermined relationship between the amount of increase of the engine output and the vehicle deceleration value. When the automatic transmission is shifted down during the vehicle deceleration, the engine output is temporarily increased by the engine output increasing means, by the amount of increase determined by the engine output increase amount determining means. In the present apparatus in which the amount of increase of the engine output is determined depending upon the vehicle deceleration value, the engine output upon the shift-down action of the transmission can be suitably controlled so that a relatively small adequate drive force is transmitted from the engine to drive wheels of the vehicle through the automatic transmission when appropriate frictional coupling devices of the automatic transmission are operated to achieve the shift-down action, even if the vehicle speed at which the frictional coupling devices are operated varies due to a variation in the deceleration value of the vehicle. Accordingly, the present apparatus is effective to prevent a shifting shock of the automatic transmission upon the shift-down action, even if the frictional coupling devices are operated at different vehicle speeds to achieve the shift-down action.

In a first preferred form of this invention, the predetermined first relationship used by the engine output increase amount determining means to determine the amount of increase of the output of the engine is formulated such that the amount of increase of the output of the engine increases with a decrease in the deceleration value of the vehicle. According to this form of the invention, the engine output can be suitably increased upon operation of the frictional coupling devices to achieve the shift-down action, since the vehicle speed upon operation of the frictional coupling devices increases with a decrease in the vehicle deceleration value, because the amount of decrease of the vehicle speed between the moment of generation of a command to shift down the automatic transmission and the moment of operation of the frictional coupling devices decreases with a decrease in the vehicle deceleration value.

In a second preferred form of this invention as applied to the automotive vehicle which further has a fluid-operated power transmitting device such as a torque converter disposed between the engine and the automatic transmission, the engine output increase amount determining means determines the amount of increase of the output of the engine, also on the basis of a ratio of an input speed of the power transmitting device to an output speed of the power transmitting device, and according to a predetermined second relationship between the amount of increase of the output and the above-indicated ratio. The predetermined second relationship is formulated such that the amount of increase of the output of the engine increases with a decrease in the above-indicated ratio. According to this preferred form of the invention, the engine output can be suitably increased upon operation of the frictional coupling devices to achieve the shift-down action, since the vehicle speed upon operation of the frictional coupling devices increases with a decrease in the speed ratio of the fluid-operated power transmitting device, because the amount of decrease of the vehicle speed between the moment of generation of a command to shift down the automatic transmission and the moment of operation of the frictional coupling devices decreases with a decrease in the speed ratio of the fluid-operated power transmitting device.

In a third preferred form of this invention, the engine output increase amount determining means determines the amount of increase of the output of the engine, also on the basis of a temperature of a working fluid of the automatic transmission, and according to a predetermined second relationship between the amount of increase of the output of the engine and the temperature of the working fluid. In this case, the predetermined second relationship is formulated such that the amount of increase of the output of the engine increases with a decrease in the temperature of the working fluid. In this respect, it is noted that the rate of flow of the working fluid from one of the frictional coupling devices decreases with a decrease in the temperature of the working fluid, and the time required for discharging the fluid from the frictional coupling device increases with a decrease in the fluid temperature. That is, the shift-down action of the automatic transmission tends to be delayed as the fluid temperature is lowered. Further, the power loss of the automatic transmission tends to increase with a result of a decrease in the engine speed as the fluid temperature is lowered. In the present form of the invention in which the amount of increase of the engine output increases with a decrease in the fluid temperature, the engine output can be suitably increased at the time of operation of the frictional coupling device so that a suitable drive force is transmitted from the engine to the vehicle drive wheels in the process of the shift-down action.

In a fourth preferred form of the present invention, the apparatus further comprises: engine output increase commanding means for generating an engine output increasing command for commanding the engine output increasing means to be operated for temporarily increasing the output of the engine; and reference determining means for determining a reference value used by the engine output increase commanding means to generate the engine output increasing command. The reference determining means determines the reference value on the basis of the deceleration value of the vehicle and according to a predetermined second relationship between the reference value and the deceleration value. In this form of the apparatus, the engine output increase commanding means generates the engine output increasing command at a first point of time before a second point of time at which it is determined that the shift-down action of the automatic transmission should take place, the first point of time being earlier than the second point of time by a time length corresponding to the reference value determined by the reference determining means. Since the engine output increasing command is generated earlier than the moment at which the automatic transmission is commanded to be shifted down, by the suitably determined time length, the engine output can be suitably increased at the time of operation of the frictional coupling devices to achieve the shift-down action, whereby the relatively small adequate drive force is transmitted from the engine to the vehicle drive wheels through the automatic transmission in the process of the shift-down action, namely, upon operation of the frictional coupling device, even if the vehicle speed upon operation of the frictional coupling devices varies due to a variation of the vehicle deceleration value at which the shift-down action is commanded.

In the above fourth preferred form of the apparatus, the reference value used for the engine output increase commanding means to generate the engine output increasing command is determined by the reference determining means on the basis of the vehicle deceleration value and according to the predetermined relationship between the reference value and the deceleration value. Further, the engine output increase commanding means generates the command for commanding the engine output increasing means to increase the engine output, at the first point of time determined by the reference value determined by the reference determining means. That is, the reference value represents a time length between the first point of time and the second point of time at which the determination that the shift-down action of the automatic transmission should take place is made. The first point of time is earlier than the second point of time by the above-indicated time length.

In one advantageous arrangement of the above fourth preferred form of this invention, the apparatus further comprises shift control means for determining whether the shift-down action of the automatic transmission should take place, on the basis of a detected load currently acting on the engine and a detected running speed of the vehicle, and according to a predetermined third relationship between the load and the running speed. The shift control means is adapted to determine that the shift-down action should take place, if the detected running speed exceeds a shift-down vehicle speed determined according to the predetermined third relationship. In this arrangement, the engine output commanding means generates the engine output increasing command when the detected running speed falls below a threshold value which is a sum of the shift-down vehicle speed and the reference value determined by the reference determining means. The predetermined second relationship used by the reference determining means is formulated such that the reference value increases with an increase in the deceleration value of the vehicle. In this arrangement, the reference value is effective to compensate for a delay of the actual engine output increase by the engine output increasing means with respect to the moment of generation of the engine output increasing command. This arrangement permits the engine output to be suitably increased when the shift-down action takes place in response to the engine output increasing command generated by the engine output commanding means.

In the above arrangement, the apparatus may further comprise shift-down action completion detecting means for detecting completion of the shift-down action of the automatic transmission, so that the increase of the engine output by the engine output increasing means is terminated the completion of the shift-down action is detected by the shift-down action completion detecting means. This arrangement permits the engine output to be maintained at the increased value for a minimum but sufficient length of time.

In a second advantageous arrangement of the above fourth preferred form of this invention, the apparatus further comprises: time measuring means for measuring a time lapse after the engine output increase commanding means has generated the engine output increasing command; shift control means for effecting the shift-down action of the automatic transmission; and shift-down action determining means for commanding the shift control means for effecting the shift-down action, when the time lapse measured by the time measuring means while the output of the engine is kept increased by the engine output increasing means has exceeded predetermined threshold. In this respect, it is noted that the vehicle speed is less likely to be lowered while the engine output is kept increased by the engine output increasing means, although the automatic transmission should be shifted down. However, the present arrangement permits the shift-down action to take place the predetermined time after the moment of generation of the engine output increasing command, that is, after the vehicle speed has fallen down below a level at which the engine output increasing command is generated.

BRIEF DESCRIPTION OF THE DRAWINGS

The above and other objects, features, advantages and industrial and technical significance of this invention will be better understood by reading the following detailed description of a presently preferred embodiment of the invention, when considered in connection of the accompanying drawings, in which:

FIG. 4 is a view indicating a relationship between combinations of operating states of solenoid coils, clutches and brakes for establishing the respective operating positions of the automatic transmission;

FIG. 6 is a view indicating a relationship used by the control apparatus for determining an amount of increase of an output of the engine on the basis of a vehicle deceleration value;

FIG. 7 is a view indicating a relationship used by the control apparatus to determine the amount of increase of the engine output on the basis of a temperature of a working oil of the automatic transmission;

FIG. 8 is a view indicating a relationship used by the control apparatus to determine a reference value for generating a command to temporarily increase the engine output, on the basis of the vehicle deceleration value;

DETAILED DESCRIPTION OF THE PREFERRED EMBODIMENT

Figure 1:
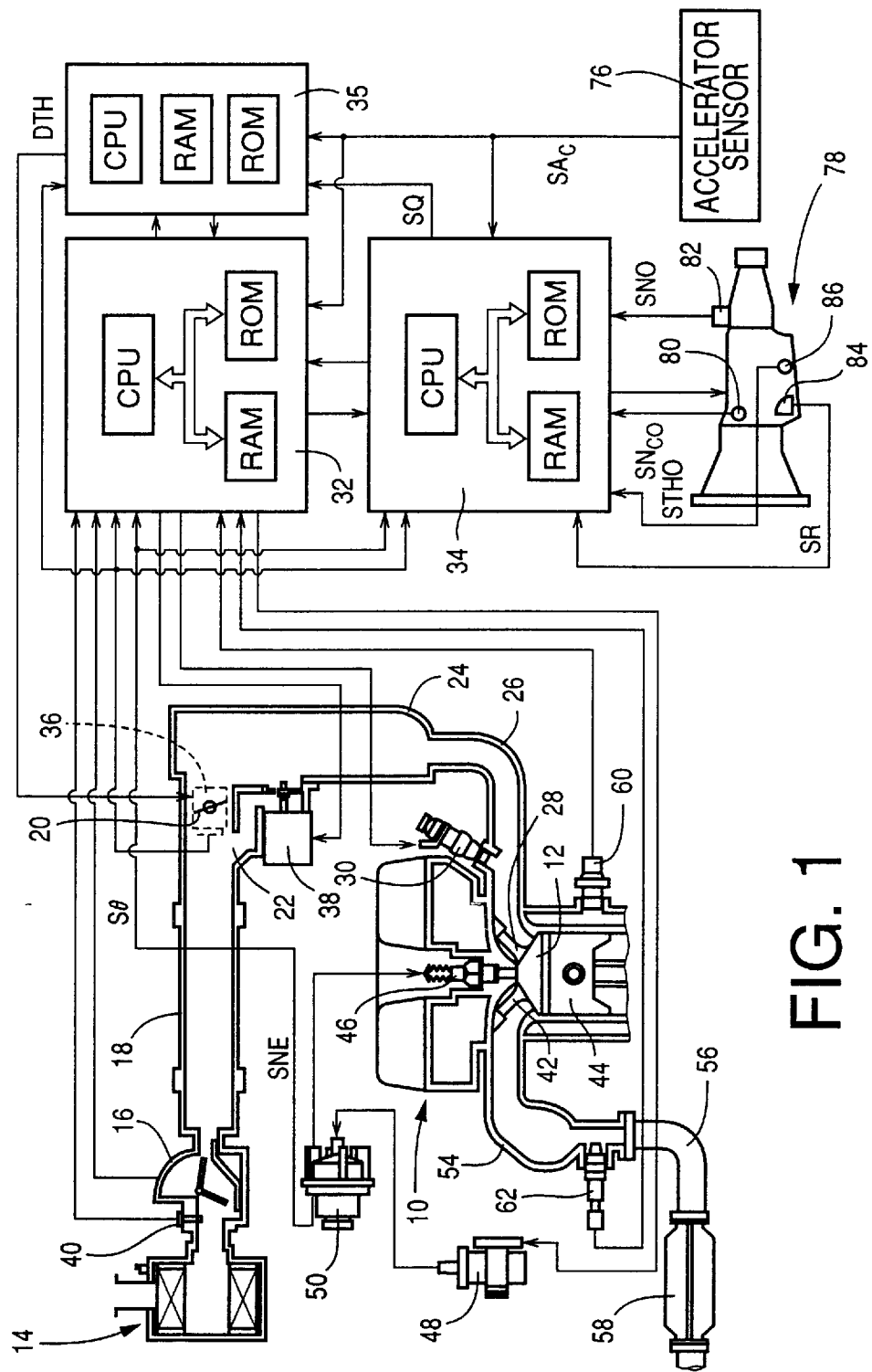
FIG. 1 is view schematically illustrating an automatic transmission, an engine of an automotive vehicle, and one embodiment of a control apparatus of this invention for controlling the engine and the automatic transmission.

Referring first to FIG. 1, an engine 10 of an automotive vehicle has combustion chambers 12 each of which is supplied with air through an air cleaner 14, an air flow meter 16, an intake pipe 18, a throttle valve 20, a by-pass passage 22, a surge tank 24, an intake manifold 26 and an intake valve 28. The intake manifold 26 is provided with a fuel injector valve 30 for injecting a fuel thereinto, for producing an air-fuel mixture. The air flow meter 16 is adapted to measure an intake air quantity Q, and apply an output signal indicative of the measured intake air quantity Q to an engine control computer 32. The throttle valve 20 is capable of continuously changing the amount of flow of the intake air into the engine 10. An opening angle e of the throttle valve 20 is controlled according to a THROTTLE CONTROL signal DTH received from a throttle control computer 35. The throttle valve 20 is provided with a throttle position sensor 36, which applies a THROTTLE OPENING signal Sθ indicative of the throttle opening angle θ to the engine control computer 32, a transmission control computer 34 and the throttle control computer 35.

The by-pass passage 22 is disposed in parallel with the throttle valve 20. An idling speed control valve 38 (ISC valve), which is provided in the by-passage 22, is controlled by the engine control computer 32, so as to regulate the amount of the intake air which flows through the by-pass passage 22 while by-passing the throttle valve 20, so that the idling speed of the engine 10 is controlled. The fuel injector valve 30 is also controlled by the engine control computer 32, to regulate the timing and amount of injection of the fuel into the combustion chamber 12. An intake air temperature sensor 40 is disposed upstream of the air flow meter 16. This sensor 40 applies a signal indicative of the temperature of the intake air to the engine control computer 32.

For each combustion chamber 12 of the engine 10, there are provided an intake valve 28, an exhaust valve 42, a piston 44 and a spark plug 46. The spark plug 46 generates a spark for igniting the compressed fuel-air mixture in the combustion chamber 12, with a high voltage supplied from an ignitor 48 through a distributor 50 under the control of the engine control computer 32, so that the piston 44 is reciprocated to rotate a crankshaft 118 (shown in FIG. 3). The intake valve 28 and the exhaust valve 42 are opened and closed by a cam shaft which is rotated in synchronization with the rotation of the crankshaft 118. A valve timing adjusting mechanism as well known in the art is controlled by the engine control computer 32, to change the rotation phase of the camshaft and the crankshaft 118, for adjusting the opening and closing timing of the intake and exhaust valves 28, 42. Exhaust emissions produced as a result of ignition of the air-fuel mixture in the combustion chamber 12 are discharged into the atmosphere through the exhaust valve 42, an exhaust manifold 54, an exhaust pipe 56 and a catalytic device 58.

The engine 10 is provided with a water temperature sensor 60 adapted to measure a temperature of an engine coolant and apply an output signal indicative of the coolant temperature to the engine control computer 32. The exhaust manifold 54 is provided with an oxygen sensor 62 adapted to detect an oxygen concentration of the exhaust gas and apply an output signal indicative of the oxygen concentration to the engine control computer 32. The distributor 50 is provided with an engine speed sensor which generates a pulse signal in synchronization with the rotation of the crankshaft 118. The pulse signal, which indicates a speed NE of the engine 10, is applied, as an ENGINE SPEED signal SNE, to the engine control computer 32 and the transmission control computer 34. An accelerator sensor 76 is provided to detect an operating amount Ac of an accelerator pedal (not shown). The accelerator sensor 76 generates an ACCELERATOR OPERATION AMOUNT signal SAc indicative of the operating amount Ac, which is applied to the engine control computer 32, transmission control computer 34 and throttle control computer 35.

Figure 2:
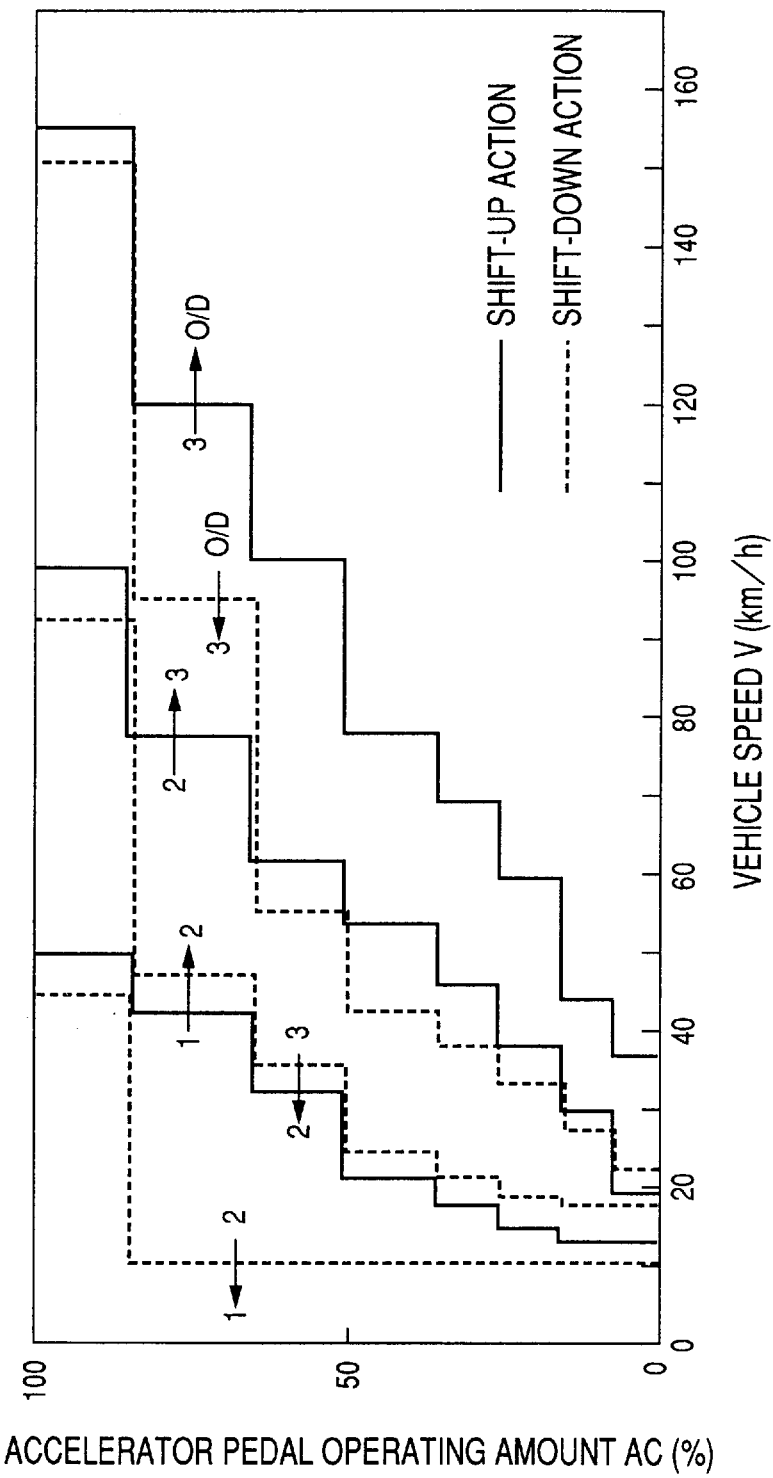
FIG. 2 is a view indicating shift-up and shift-down boundary lines used by the control apparatus for automatically shifting the automatic transmission.

Each of the engine control computer 32, transmission control computer 34 and throttle control computer 35 incorporates a central processing unit (CPU), a random-access memory (RAM), a read-only memory (ROM), an input-output interface circuit, and an A/D converter. The CPU operates to perform signal processing operations according to control programs stored in the ROM, while utilizing a temporary data storage function of the RAM. For instance, the engine control computer 34 performs an operation to control the fuel combustion of the engine 10, an operation to cut a supply of the fuel to the combustion chamber 12, and an operation to control the idling speed of the engine 10. The transmission control computer 34 is adapted to control an automatic transmission 78, more specifically, selectively establish one of the operating positions of the automatic transmission 78 according to predetermined shift-up and shift-down boundary lines, as shown in FIG. 2 by way of example, on the basis of a running speed V of the vehicle and the operating amount Ac of the accelerator pedal. The throttle control computer 35 is adapted to determine the opening angle θ of the throttle valve 20, on the basis of the operating amount Ac of the accelerator pedal, and according to a predetermined relationship between the operating amount Ac and the throttle opening angle θ. The throttle control computer 35 controls a throttle actuator (not shown) for controlling the throttle valve 20 so as to establish the determined opening angle θ.

Figure 3:
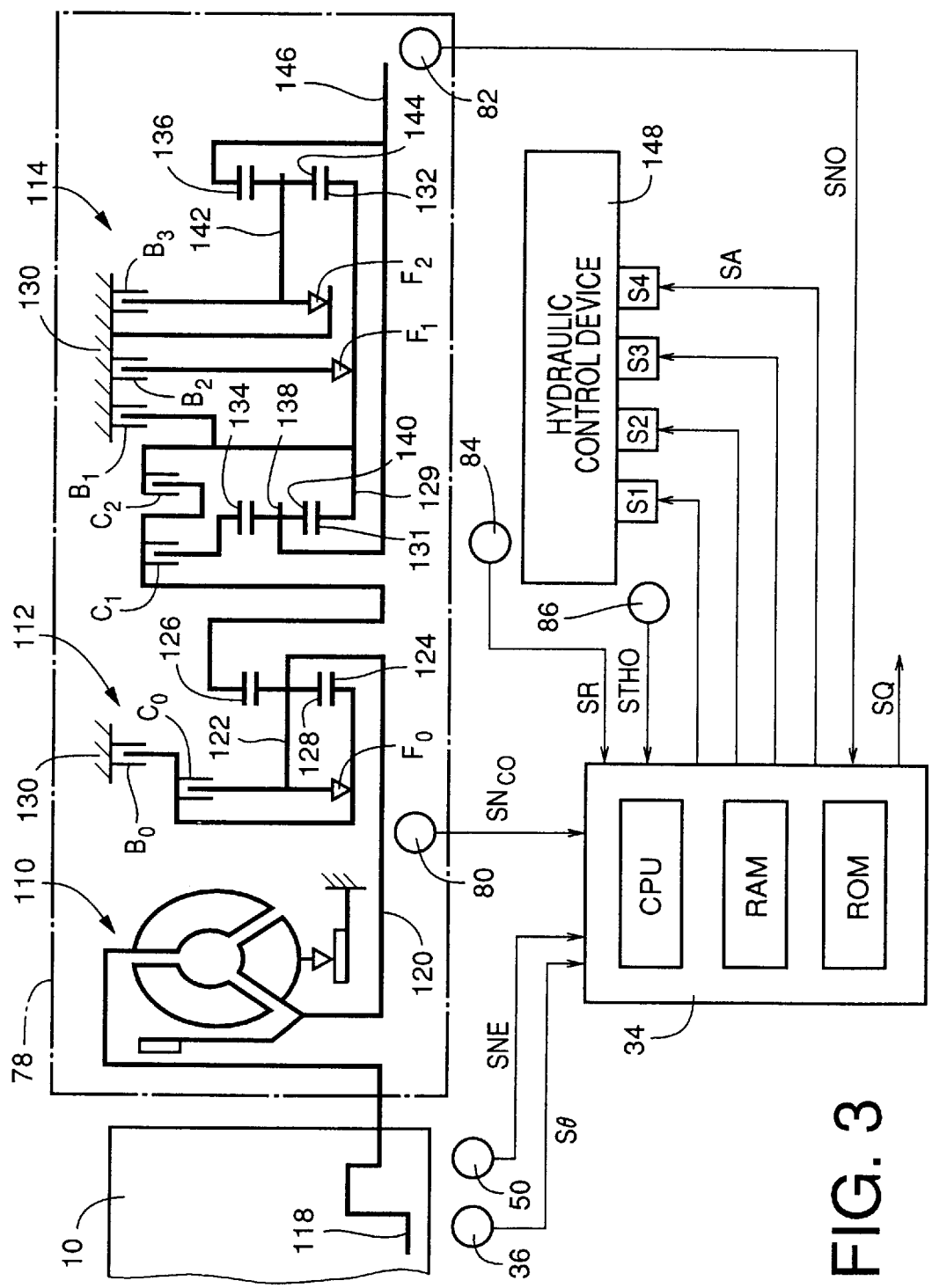
FIG. 3 is a schematic view showing the construction of the automatic transmission.

Referring to FIG. 3, the automatic transmission 78 includes a fluid-operated power transmitting device in the form of a torque converter 110, a first transmission unit 112 and a second transmission unit 114. The torque converter 110 includes a pump impeller connected to the crankshaft 118 of the engine 10, and a turbine impeller connected to a carrier 122 of the first transmission unit 112 through an input shaft 120. The first transmission unit 112 includes a planetary gear device having a sun gear 124, a ring gear 126, the carrier 122, and a planetary gear 128 which is rotatably supported by the carrier 122 and which meshes with the sun gear 124 and the ring gear 126. Between the sun gear 124 and the carrier 122, there are disposed a clutch C0 and a one-way clutch F0 in parallel with each other. Between the sun gear 124 and a housing 130 of the automatic transmission 78, there is disposed a brake B0.

The second transmission unit 114 includes a pair of planetary gear devices comprising a sleeve shaft 129, sun gears 131, 132 disposed at the opposite ends of the sleeve shaft 129, a pair of ring gears 134, 136, a pair of carriers 138, 142, and planetary gears which are rotatably supported by the carriers 138, 142 and which mesh with the sun gears 131, 132 and the ring gears 134, 136. A clutch C1 is disposed between the ring gear 134 and the ring gear 126 of the first transmission unit 112. A clutch C2 is disposed between the sleeve shaft 129 and the ring gear 126. Between the sleeve shaft 129 and the housing 130, there are disposed a brake B1, and a series connection of a one-way clutch F1 and a brake B2, such that the series connection is parallel with the brake B1. Between the carrier 142 and the housing 130, there are disposed a brake B3 and a one-way clutch F2 in parallel with each other. The carrier 138 and the ring gear 136 are integrally connected to an output shaft 146 of the automatic transmission 78. The output shaft 146 is operatively connected to drive wheels of the vehicle through a differential gear device.

The clutches C0–C2 and brakes B0–B3 (generally referred to as "clutches C" and "brakes B" where appropriate) are multiple-disc clutches and band brakes, or other suitable hydraulically operated frictional coupling devices which are engaged and disengaged (released) by respective hydraulic actuators. These hydraulic actuators are controlled by a hydraulic control device 148 which includes various control valves controlled by solenoid coils S1, S2 and S3 that are energized and de-energized according to control signals from the transmission control computer 34, so that the clutches C and brakes B are selectively engaged to selectively establish one of four forward-drive positions of the automatic transmission 78, that is, first-speed position "1st", second-speed position "2nd", third-speed position "3rd", and fourth-speed position "4th" (overdrive position "OD"), as indicated in FIG. 4. In the table of FIG. 4, "o" represents the energization of the solenoid coils S1, S2 and the engaged state of the clutches C, F and brakes B. The vehicle has a shift lever operable by the vehicle operator. The shift lever has six operating positions, namely, PARKING position "P", REAR-DRIVE position "R", NEUTRAL position "N", FORWARD-DRIVE position "D", SECOND position "2" and LOW position "L", as also indicated in the table of FIG. 4. When the shift lever is placed in the FORWARD-DRIVE position, the transmission control computer 34 selects one of the four forward-drive positions "1st" through "4th" of the automatic transmission 78. When the shift lever is in the SECOND position "2", the transmission control computer 34 selects one of the three forward-drive positions "1st", "2nd" and "3rd". In the LOW position "L", the transmission control computer 34 selects either the first-speed position "1st" or the second-speed position "2nd".

The first-speed, second-speed, third-speed and fourth-speed positions "1st", "2nd", "3rd" and "4th" have respective speed ratios which decrease in the order of description. The speed ratios are represented by the rotating speed of the input shaft 120 divided by the rotating speed of the output shaft 146. The speed ratio of the third-speed position "3rd" is 1.0. When the vehicle is running. in a decelerating state, the 4–3 shift-down action of the automatic transmission 78 from the fourth-speed position "4th" to the third-speed position "3rd" is achieved by a releasing or disengaging action of the brake B0 and an engaging action of the clutch C0. When the vehicle is running in an accelerating state, the 4–3 shift-down action is achieved by the releasing action of the brake B0 and an engaging action of the one-way clutch F0. When the shift lever is operated to the REAR-DRIVE position "R", a manual shift valve provided in the hydraulic control device 148 is operated to shift the automatic transmission to a reverse position "R".

The automatic transmission 78 is provided with an input speed sensor 80 and an output speed sensor 82. The input speed sensor 80 is adapted to detect the rotating speed of the sun gear 124 of the first transmission unit 112, that is, rotating speed NCO of the drum or housing of the clutch C0, while the output speed sensor 82 is adapted to detect a rotating speed NO of the output shaft 146. These input and output sensors 80, 80 generate an INPUT SPEED signal SNCO indicative of the speed NCO and an OUTPUT SPEED signal SNO indicative of the speed NO, respectively, which are applied to the transmission control computer 34. The hydraulic control device 148 is provided with a shift position sensor 84 adapted to detect the position of the manual shift valve operatively connected to the shift lever, for thereby detecting the currently established one of the operating positions of the shift lever such as the FORWARD-DRIVE, LOW and REAR-DRIVE positions "D", "L", "R".

The shift position sensor 84 generates a SHIFT POSITION signal SR indicative of the currently selected position of the shift lever, which is also applied to the transmission control computer 34. The hydraulic control device 148 is also provided with an oil temperature sensor 86 adapted to detect a temperature THO of the working oil of the transmission system. The oil temperature sensor 86 generates an OIL TEMPERATURE signal STHO indicative of the oil temperature THO, which is also applied to the transmission control computer 34.

The engine, transmission and throttle control computers 32, 34, 35 are interconnected to each other for receiving necessary signals from each other. In this arrangement, it suffices for at least one of the control computers 32, 34, 35 to receive the output signals of the various sensors described above such as the THROTTLE OPENING signal Sθ, ENGINE SPEED signal SNE and ACCELERATOR OPERATION AMOUNT signal SAc. These control computers 32, 34, 35 may be adapted to receive signals indicative of various other operating parameters or variables of the vehicle such as rotating angle of a steering wheel, a gradient of the road surface and exhaust gas temperature, for suitably controlling the engine 10, automatic transmission 78 and throttle valve 20.

The engine control computer 32 controls the fuel injector valve 30 and the ignitor 48 to control the timing and amount of fuel injection into the engine 10 and the timing of the spark, on the basis of the intake air quantity, throttle opening θ, engine speed NE, engine coolant temperature, intake air temperature, oxygen concentration in the exhaust pipe 56, operating amount Ac of the accelerator pedal, etc., and according to predetermined data maps or equations which are formulated to assure an adequate output of the engine 10 while minimizing the fuel consumption and the amount of harmful exhaust emissions. While the vehicle is in a decelerating state or stationary with the operating amount Ac of the accelerator pedal being zero, the engine control computer 32 determines a target value of the engine idling speed on the basis of the engine coolant temperature and the operating states of optional devices such as an air conditioner, and according to a predetermined relationship between the target value of the engine idling speed and the coolant temperature and the operating states indicated above. The engine control computer 32 controls the idling speed control valve 38 so that the actual engine idling speed NE coincides with the determined target value.

The transmission control computer 34 stores in its ROM the shift-up and shift-down boundary lines as indicated in FIG. 2 by way of example. Each of these boundary lines represents a relationship between the operating amount Ac of the accelerator pedal or the throttle opening angle θ and the vehicle running speed V. The operating amount Ac or throttle opening angle θ represents a load which actually acts on the engine 10. The vehicle running speed V is obtained from the speed NO of the output shaft 146 of the automatic transmission 78. On the basis of the detected operating amount Ac or throttle opening angle θ and the detected vehicle speed V, and according to the shift-up and shift-down boundary lines, the transmission control computer 34 determines whether the automatic transmission 78 should be shifted up or down from the currently established position. Upon determination that a ehift-up or shift-down action of the automatic transmission 78 is necessary, the transmission control computer 34 selectively energizes or de-energizes the solenoid coils S1, S2 and S3 so as to shift up or down the automatic transmission 78.

The engine control computer 32 and the transmission control computer 34 are arranged to control the engine 10 and the automatic transmission 78 in relation to the throttle opening angle θ and the opening angle of the idling speed control valve 38, so as to reduce the time of a shift-down action of the automatic transmission 78 while minimizing a shifting shock thereof, while the vehicle is coasting, namely, running on a downhill or in a decelerating state with an engine brake applied thereto, and with the operating amount Ac of the accelerator pedal being substantially zero. There will be described a control apparatus which includes the control computers 32, 34, 35 and which is constructed according to the principle of this invention, to control the engine 10 and the automatic transmission 78 upon shift-down actions of the transmission during coasting or deceleration of the vehicle with engine brake application.

Figure 5:
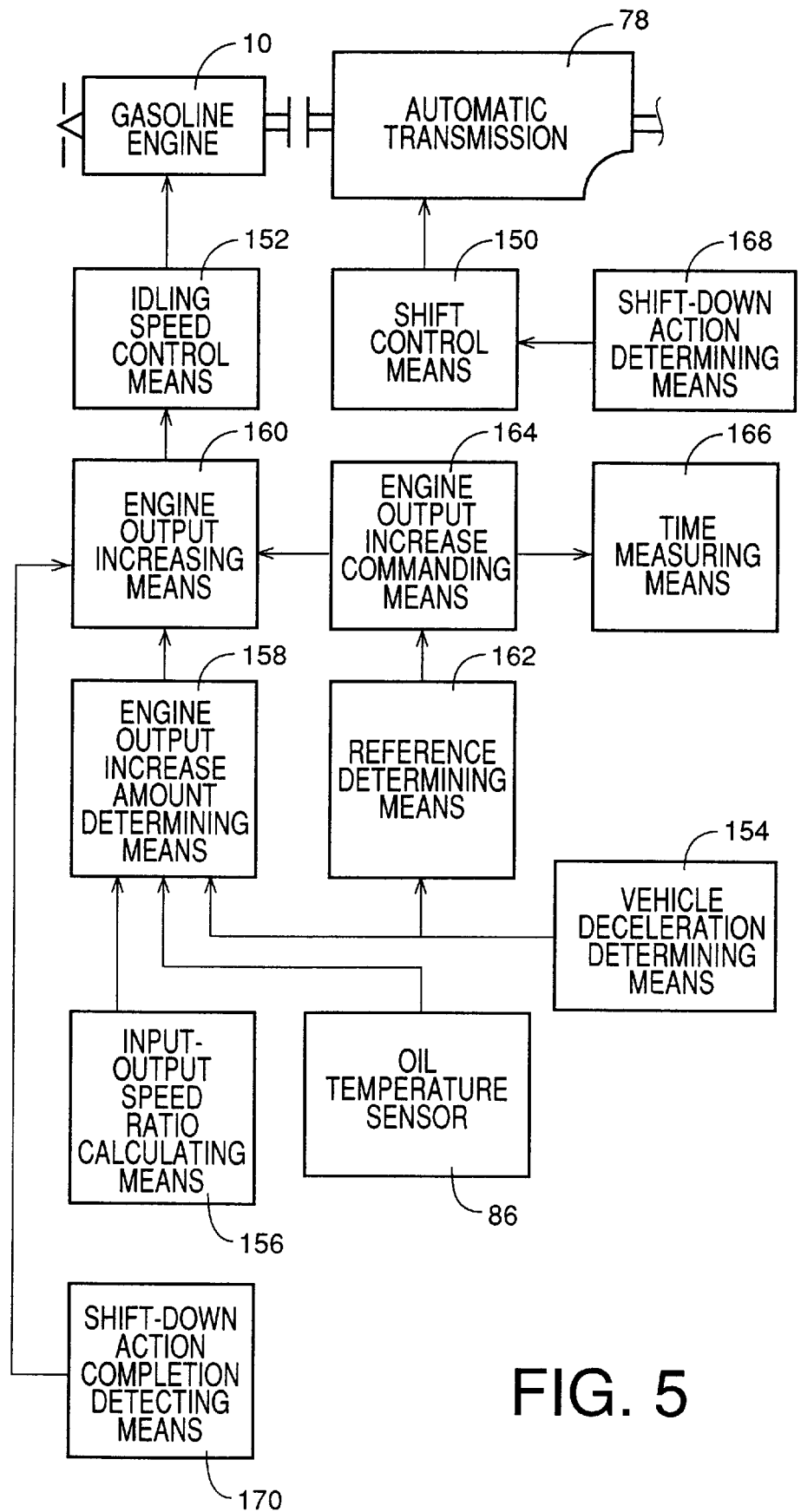
FIG. 5 is block diagram showing functional means of the control apparatus of FIG. 1.

The control apparatus includes various functional means as illustrated in the block diagram of FIG. 5. These functional means include shift control means 150, idling speed control means 152, vehicle deceleration determining means 154, input-output speed ratio, calculating means 156, engine output increase amount determining means 158, engine output increasing means 160, reference determining means 162, engine output increase commanding means 164, time measuring means 166, shift-down action determining means 168, and shift-down action completion detecting means 170.

The shift control means 150 is adapted to determine whether the automatic transmission 78 should be shifted up or down from the currently established position or not. As explained above, this determination is effected on the basis of the operating amount Ac of the accelerator pedal (or the opening angle θ of the throttle valve 20) and the vehicle running speed V, and according to the predetermined shift-up and shift-down boundary lines as indicated in FIG. 2, for example. The shift control means 150 controls the solenoid coils S1, S2, S3 so as to achieve a shift-up or shift-down action of the automatic transmission 78 according to the determination.

The idling speed control means 152 is adapted to determine the target value of the engine idling speed NE while the vehicle is decelerating or stationary with the operating amount Ac of the accelerator pedal being zero. This determination is effected on the basis of the detected coolant temperature of the engine 10 and the detected operating states of the optional devices such as the air conditioner, and according to the predetermined relationship between the target value and these detected parameters. The idling speed control means 152 control an opening angle $V_{ISC}$ of the idling speed control (ISC) valve 38 so that the. actual engine idling speed NE coincides with the determined target value.

The vehicle deceleration determining means 154 is adapted to determine a rate of change of the output shaft speed NO of the automatic transmission 78 on the basis of the OUTPUT SPEED signal SNO which is received from the output speed sensor 82 at a predetermined sampling period. The rate of change of the output shaft speed NO represents a deceleration value $\Delta NO$ of the vehicle, which varies with the road surface gradient and the operating state of the braking system, as mentioned above.

The input-output speed ratio calculating means 156 is adapted to calculate a speed ratio NE/NT of the torque converter 110, which is a ratio of the speed NE of the engine 10 (which is equal to the speed of the input shaft of the torque converter 110) to the speed NT of the input shaft of the torque converter 110 (which is equal to the speed of the input shaft 120 of the automatic transmission 78). The speed ratio NE/NT is calculated on the basis of the ENGINE SPEED signal SNE and the INPUT SPEED signal SNCO which are received from the engine speed sensor (incorporated in the distributor 50) and the input speed sensor 80 at a predetermined sampling period.

The engine output increase amount determining means 158 is adapted to determine an amount vdcst1 of increase of the output of the engine 10, on the basis of the detected vehicle deceleration value $\Delta NO$ (rate of change of the speed NO of the output shaft 146, which is a positive value), and according to a predetermined relationship between the engine output increase amount vdcst1 and the deceleration value $\Delta NO$. This relationship, which is indicated in FIG. 6, is represented by a data map stored in the ROM. The vdcst1-$\Delta NO$ relationship is formulated such that the engine output increase amount vdcst1 decreases with an increase of the vehicle deceleration value $\Delta NO$, so that a relatively small drive force is transmitted through the automatic transmission 78 from the engine 10 to the drive wheels during a shift-down action thereof while the vehicle is decelerating or coasting.

The engine output increase amount determining means 158 is adapted to determine the engine output increase amount vdcst1 also on the basis of the input-output speed ratio NE/NT of the torque converter 110, and according to a predetermined relationship between the value vdcst1 and the speed ratio NE/NT, as also indicated in FIG. 6. This relationship, which is represented by a data map also stored in the ROM, is formulated such that the engine output increase amount vdcst1 decreases with an increase in the input-output speed ratio NE/NT, namely, increases with a decrease in the speed ratio NE/NT.

The relationships indicated in FIG. 6 by way of example are used for a 4–3 shift-down action of the automatic transmission 78 from the fourth-speed position "4th" to the third-speed position "3rd" during vehicle deceleration, and were obtained by experiments, to determine the engine output increase amount vdcst1 so that a relatively small positive drive torque is transmitted from the engine 10 to the output shaft 146 during the 4–3 shift-down action, in order that the engine speed NE upon releasing of the brake B0 to achieve the 4–3 shift-down action is higher than the speed NCO of the drum of the clutch C0 (or the speed of the clutch C1), by a suitable amount, say, several to several tens of r.p.m., for reducing an engaging shock of the one-way clutch F0 to a permissible or tolerable level.

The engine output increase amount determining means 158 is also adapted to determine an engine output increase amount vdcst2 on the basis of the oil temperature THO of the automatic transmission 78 detected by the oil temperature sensor 86, and according to a predetermined relationship between the engine output increase amount vdcst2 and the oil temperature THO. This relationship, which is indicated in FIG. 7 by way of example, is represented by a data map also stored in the ROM, and is formulated such that the engine output increase amount vdcst2 decreases with an increase in the oil temperature THO, namely, increases with a decrease in the oil temperature THO. The relationship of FIG. 7, which is used for the 4–3 shift-down action of the automatic transmission 78 during vehicle deceleration was obtained by experiments, to determine the engine output increase amount vdcst2 so that a relatively small torque is transmitted from the engine 10 to the output shaft 146 through the automatic transmission 78 during the 4–3 shift-down action, in view of a tendency that the engine speed NE decreases with an increase in the power loss of the automatic transmission 78 which in turn increases with an decrease in the rate of flow of the working oil from the brake B0 in the process of being released.

The engine output increasing means 160 is adapted to control the ISC 38 upon a shift-down action of the automatic transmission 78 during deceleration or coasting of the vehicle so that the opening angle $V_{ISC}$ determined by the idling speed control means 152 is increased by an amount corresponding to a total engine output increase amount vdcst=vdcst1 and vdcst2 determined by the engine output increase amount determining means 158, so that the engine output upon the shift-down action during coasting of the vehicle is increased by the amount vdcst with respect to the value in the normal idling state of the engine 10.

The reference determining means 162 is adapted to determine a reference value KNO on the basis of the determined vehicle deceleration value $\Delta NO$ and according to a predetermined relationship between the reference value KNO and the deceleration value $\Delta NO$. This relationship, which is indicated in FIG. 8 by way of example, is represented by a data map stored in the ROM. The reference value KNO is used by the engine output increase commanding means 164 (which will-be described) to generate an engine output increasing command for temporarily increasing the engine output. The relationship used by the reference determining means 162 is formulated such that the reference value KNO increases with an increase in the vehicle deceleration value $\Delta NO$.

The engine output increase commanding means 164 generates the engine output increasing command for commanding the engine output increasing means 160 to temporarily increase the engine output, when the detected vehicle speed V (obtained from the output shaft speed NO of the automatic transmission 78) falls below a threshold value which is a sum of a shift-down speed (determined by the appropriate shift-down boundary line) and a value corresponding to the reference value KNO determined by the reference determining means 162. In the present embodiment, the engine output increase commanding means 164 is adapted to generate the engine output increasing command when the detected speed NO of the output shaft 146 of the automatic transmission falls below a threshold which is a sum of a 4–3 shift-down speed $NO_{4\ 3}$ of the output shaft of the automatic transmission and the reference value KNO. The 4–3 shift-down speed $NO_{4\ 3}$ corresponds to a 4–3 shift-down vehicle speed $V_{4\ 3}$ determined by the 4–3 shift-down boundary line (3←O/D broken line indicated in FIG. 2).

Thus, the engine output increase commanding means 164 commands the engine output increasing means 160 to increase the engine output before the vehicle speed V has been lowered below the shift-down speed. In other words, the point of time at which the engine output increasing means 160 is activated to temporarily increase the engine output is earlier than the point of at which the shift control means 150 normally determines that the automatic transmission 78 should be shifted down. The former point of time is earlier than the latter point of time by a time length corresponding to the reference value KNO.

The time measuring means 166 is adapted to measure a time lapse $T_{EL}$ after the engine output increase commanding means 164 generates the engine output increasing command to activate the engine output increasing means 160. The time lapse $T_{EL}$ measured by the time measuring means 166 is a time which has passed after the moment at which the actual output shaft speed NO of the automatic transmission 78 has been lowered below a sum of the shift-down speed $NO_{4\ 3}$ and the reference value KNO.

The shift-down action determining means 168 is adapted to activate the shift control means 150 to shift the automatic transmission 78 when the time lapse $T_{EL}$ measured by the time measuring means 166 has exceeded a predetermined threshold $T_{EL1}$, that is, when the predetermined time $T_{EL1}$ has passed after the engine output increasing means 160 is activated to increase the engine output by the amount vdcst with respect to the normal engine idling output.

The shift-down action completion detecting means 170 is adapted to detect the completion of the shift-down action of the automatic transmission 78 during vehicle deceleration, depending upon whether the input-output speed ratio NT/NO of the transmission 78 is equal to the speed ratio of the operating position of the transmission 78 which is to be established after the shift-down action. The engine output increasing means 160 is kept operated to maintain the increased engine output until the shift-down action completion detecting means has detected the completion of the shift-down action.

Figure 9:
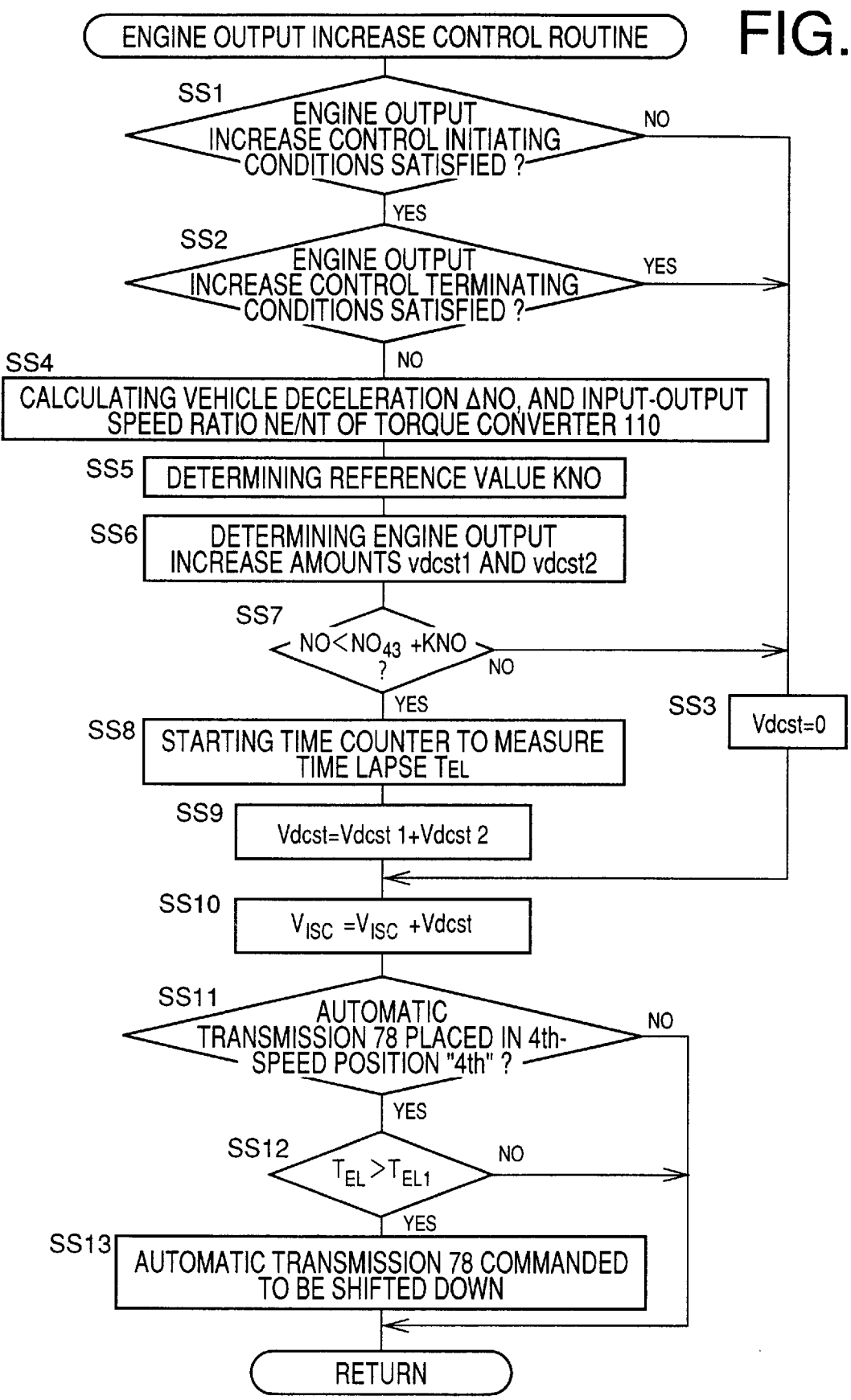
FIG. 9 is a flow chart illustrating an engine output increase control routine executed by the control device.

The control apparatus which has been described above and which includes the engine, transmission and throttle control computers 32, 34, 35 is adapted to execute an engine output increase control routine as illustrated in the flow chart of FIG. 9 for increasing the output of the engine 10 upon the 4–3 shift-down action of the automatic transmission 78 during coasting or deceleration of the vehicle. This routine is executed at a predetermined cycle time of about 8–32 msec.

The routine of FIG. 9 is initiated with step SS1 to determine whether predetermined conditions for initiating the engine output increase control have been satisfied. If an affirmative decision (YES) is obtained in step SS1, the control flow goes to step SS2 to determine whether predetermined conditions for terminating the engine output increase control. For instance, the engine output increase control initiating conditions include: 1) that the shift lever is placed in the FORWARD-DRIVE position; 2) that the automatic transmission 78 is placed in the fourth-speed position "4th" ("OD"); 3) that the vehicle speed V is higher than a level corresponding to 1500 r.p.m. of the output shaft speed NO of the automatic transmission 78; and 4) that the vehicle deceleration value ΔNO is not lower than zero (that the amount of decrease of the vehicle speed V per cycle time of the routine is 0 r.p.m. or larger). For instance, the engine output increase terminating conditions include: 1) that the shift lever is not placed in the FORWARD-DRIVE position; 2) that the 4–3 shift-down action of the automatic transmission 78 is completed; and 3) the vehicle speed V is lower than a level corresponding to 500 r.p.m. of the output shaft speed NO of the automatic transmission 78.

If a negative decision (NO) is obtained in step SS1 or if an affirmative decision (YES) is obtained in step SS2, the control flow goes to step SS3 in which the engine output increase amount vdcst is set to "0", whereby the engine idling speed is controlled in the normal manner. If the affirmative decision (YES) is obtained in step SS1 and a negative decision (NO) is obtained in step SS2, the control flow goes to step SS4 corresponding to the vehicle deceleration determining means 154 and the input-output speed ratio calculating means 156. In this step SS4, the rate of change of the output shaft speed NO of the automatic transmission 78 is determined to determine the actual deceleration value ΔNO of the vehicle. In addition, the input-output speed ratio NE/NT of the torque converter 110 is calculated on the basis of the input shaft speed NE of the torque converter 110 and the output shaft speed NT of the torque converter 110 (turbine impeller speed of the torque converter, which is equal to the input shaft speed of the automatic transmission 78).

Step SS4 is followed by step SS5 corresponding to the reference determining means 162, to determine the reference value KNO on the basis of the determined vehicle deceleration value ΔNO and according to the predetermined relationship of FIG. 8 between the reference value KNO and the deceleration value ΔNO. The determined reference value KNO is used by the engine output increase commanding means 164 to generate the engine output increasing command, as described below with respect to steps SS7, SS9 and SS10. Step SS5 is followed by step SS6 corresponding to the engine output increase amount determining means 158, to determine the engine output increase amount vdcst1 and the engine output increase amount vdcst2. The engine output increase amount vdcst1 is determined on the basis of the vehicle deceleration value ΔNO and the input-output speed ratio NE/NT of the torque converter 110 which have been determined in step SS4 and according to the predetermined relationships of FIG. 6 between the increase amount vdcst1 and the vehicle deceleration value ΔNO and ratio NE/NT. The engine output increase amount vdcst2is determined on the basis of the oil temperature THO of the automatic transmission 78 detected by the oil temperature sensor 86 and according to the predetermined relationship of FIG. 7 between the increase amount vdcst2 and the oil temperature THO.

Figure 10:
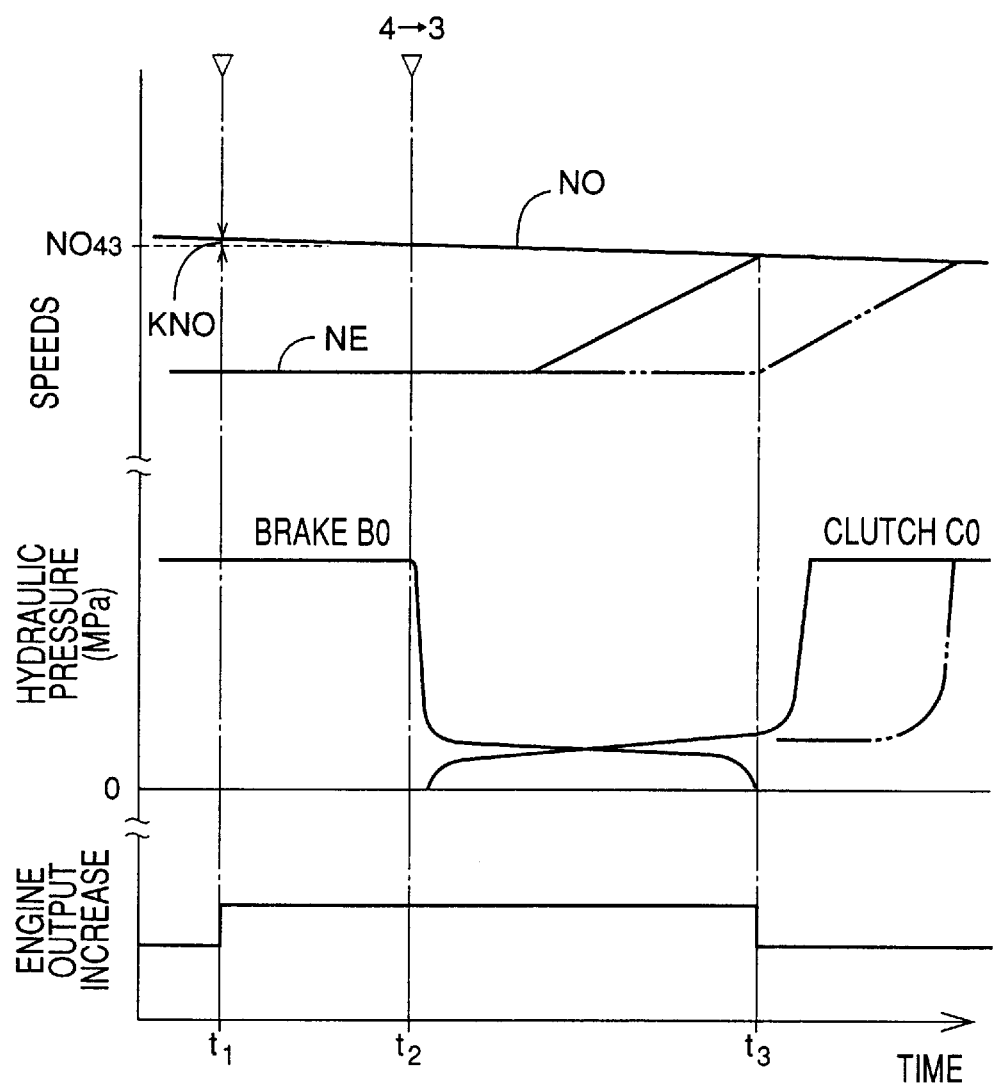
FIG. 10 is a time chart for explaining an operation of the control apparatus.

Step SS6 is followed by step SS7 to determine whether the detected output shaft speed NO of the automatic transmission 78 falls below a threshold value which is a sum of the 4–3 shift-down speed $NO_{4\ 3}$ and the reference value KNO determined in step SS5. If a negative decision (NO) is obtained in step SS7, it means that the vehicle running condition does not require initiation of an increase of the engine output, and that the engine output increasing command should not be generated. In this case, the control flow goes to step SS3. If an affirmative decision (YES) is obtained in step SS7, the control flow goes to step SS8 corresponding to the time measuring means. 166, to start a time counter for measuring the time lapse $T_{EL}$ after the affirmative decision is obtained in step SS7. Point of time t1 indicated in FIG. 10 is a moment at which the affirmative decision is obtained in step SS7.

Step SS8 is followed by step SS9 to obtain a sum vdcst of the engine output increase amounts vdcst1 and vdcst2 which have been determined in step SS6. The sum vdcst is the engine output increase amount by which the engine output is increased. Step SS9 is followed by step SS10 in which the engine output increase amount vdcst is added to the opening angle value $V_{ISC}$ of the ISC valve 38 which has been determined by the idling speed control means 152. Consequently, the opening angle $V_{ISC}$ of the ISC valve 38 is increased by the amount vdcst, whereby the engine output is increased. It will be understood that steps SS7, SS9 and SS10 correspond to the engine output increase commanding means 164. The time lapse $T_{EL}$ is a time which has passed after the engine output increasing command is generated. It will also be understood that step SS10 corresponds to the engine output increasing means 160.

Step SS10 is followed by step SS11 to determine whether the automatic transmission 78 is placed in the fourth-speed position "4th". If a negative decision (NO) is obtained, one cycle of execution of the routine of FIG. 9 is terminated. If an affirmative decision (YES) is obtained in step SS11, the control flow goes to step SS12 corresponding to the shift-down action completion determining means 168, to determine whether the time lapse $T_{EL}$ has exceeded a predetermined threshold $T_{EL1}$. This threshold $T_{EL1}$ is a suitably determined time length from the moment of generation of the engine output increasing command (the moment at which the affirmative decision is obtained in step SS7) to the moment at which the automatic transmission 78 is commanded to be shifted down from the fourth-speed position "4th" ("O/D") to the third-speed position "3rd". The threshold $T_{EL1}$ may be determined on the basis of the actual vehicle speed V or the output speed NO of the automatic transmission 78 such that the threshold $T_{EL1}$ increases with an increase in the speed V or NO.

Immediately after the engine output increasing command is generated, a negative decision (NO) is obtained in step SS12, and one cycle of execution of the routine is terminated. When the time $T_{EL1}$ has passed after the moment of generation of the engine output increasing command, an affirmative decision (YES) is obtained in step SS12, and the control flow goes to step SS13 in which the shift control means 150 is activated by the shift-down action completion determining means 168, to shift down the automatic transmission 78 from the fourth-speed position "4th" to the third-speed position "3rd", as indicated at point of time t2 in FIG. 10.

As a result, the brake B0 is released while at the same time the clutch C0 is engaged, and the engine speed NE is gradually raised to a level equal to the output shaft speed NO of the automatic transmission 78. When the engine speed NE has been raised to the output shaft speed NO, the affirmative decision (YES) is obtained in step SS2 corresponding to the shift-down action completion detecting means 170. That is, the shift-down action completion detecting means 170 detects the completion of the 4–3 shift-down action of the automatic transmission 78. In this case, the control flow goes to step SS3, to zero the engine output increase amount vdcst, namely, to terminate the increase of the engine output, as indicated at point of time t3 in FIG. 10.

In the conventional vehicle control apparatus, the engine speed NE and the hydraulic pressure MPa of the clutch C0 change as indicated by two-dot chain lines in FIG. 10, during the 4–3 shift-down action of the automatic transmission 78. In the present vehicle control apparatus, the engine output is increased at the point of time t1 by the engine output increasing means 160, so that a relatively small drive torque is transmitted from the engine 10 to the vehicle drive wheels through the automatic transmission 78 in the process of the 4–3 shift-down action. Accordingly, the engine speed NE is raised, and the one-way clutch F0 is engaged, as indicated by solid lines in FIG. 10, so that the 4–3 shift-down action can be achieved in a relatively short time.

In the present embodiment of this invention, the engine output increase amount vdcst1 is determined in step SS6 by the engine output increase amount determining means 158, on the basis of the determined vehicle deceleration value $\Delta$NO and according to the predetermined relationship of FIG. 6 between the engine output increase amount vdcst1 and the deceleration value $\Delta$NO. In the process of the 4–3 shift-down action of the automatic transmission 78 during deceleration of the vehicle (SS13), the output of the engine 10 is increased in step SS10 by the engine output increasing means 160, by the amount vdcst1 determined by the engine output increase amount determining means 158. As a result, even if the vehicle speed V at which the brake B0 and clutch C0 are actually released and engaged to achieve the 4–3 shift-down-action of the automatic transmission 78 vary due to a variation in the vehicle deceleration value $\Delta$NO, the engine output can be increased to a suitable value at the time of the releasing and engaging actions of the brake B0 and clutch C0 (frictional coupling devices), so that a relatively small adequate drive torque is transmitted from the engine 10 to the vehicle drive wheels through those frictional coupling devices in the transient states, so as to effectively prevent or minimize a shifting shock of the automatic transmission 78.

The present vehicle control apparatus further includes the reference determining means 162 (SS5) for determining the reference value KNO on the basis of the determined vehicle deceleration value $\Delta$NO and according to the predetermined relationship of FIG. 8 between the reference value KNO and the deceleration value $\Delta$NO, so that the engine output increasing command is generated in steps SS7, SS9 and SS10 by the engine output increase commanding means 164, to temporarily increase the engine output, when the output shaft speed NO of the automatic transmission 78 has been lowered below the threshold (NO$_{4\text{-}3}$+KNO). In this respect, it is noted that the moment (first point of time) at which the engine output increasing means 160 is activated by the engine output increase commanding means 164 to increase the engine output is earlier than the moment at which the output shaft speed NO is lowered below the 4–3 shift-down speed NO$_{4\text{-}3}$, that is, earlier than the moment (second point of time) at which the automatic transmission 78 is conventionally commanded to initiate the 4–3 shift-down action. The first point of time is earlier than the second point of time, by a time corresponding to the reference value KNO. Therefore, even if the vehicle speed V at which the brake B0 and clutch C0 are released and engaged vary due to a variation in the vehicle deceleration value $\Delta$NO, the engine output can be increased to the suitable value at the time of the releasing and engaging actions of the brake B0 and clutch C0, so that the relatively small adequate drive torque is transmitted from the engine 10 to the vehicle drive wheels through the automatic transmission 78 in the process of the 4–3 shift-down action, whereby the shifting shock of the automatic transmission 78 can be effectively prevented or minimized.

In the present embodiment, the predetermined relationship of FIG. 6 used in step SS6 by the engine output increase amount determining means 158 to determine the engine output increase amount vdcst1 is formulated such that the engine output increase amount vdcst1 increases with a decrease in the vehicle deceleration value $\Delta$NO. According to this arrangement, the engine output can be suitably increased upon the releasing and engaging actions of the frictional coupling devices B0, C0, since the vehicle speed at this time increases with a decrease in the vehicle deceleration value, because the amount of decrease of the vehicle speed between the moment of generation of a command to shift down the automatic transmission and the moment of the operation of the frictional coupling devices decreases with a decrease in the vehicle deceleration value.

The engine output increase amount determining means 158 is also adapted to determine the engine output increase amount vdcst1 also on the basis of the input-output speed ratio NE/NT of a fluid-coupling power transmitting device in the form of the torque converter 110 disposed between the engine 10 and the automatic transmission 78. The predetermined relationship of FIG. 6 between the engine output increase amount vdcst1 and the speed ratio NE/NT is used to is formulated such that the engine output increase amount vdcst1 increases with a decrease in the speed ratio NE/NT, so that a relatively small adequate drive torque can be transmitted from the engine 10 to the vehicle drive wheels through the automatic transmission 78 in the process of the 4–3 shift-down action. According to this arrangement, the engine braking force applied to the vehicle during the 4–3 shift-down action decreases with a decrease in the difference between the input and output shaft speeds of the torque converter 110, and therefore the vehicle speed upon releasing and engaging operations of the frictional coupling devices B0, C0 increases with a decrease in the speed ratio of the torque converter 110, because the amount of decrease of the vehicle speed between the moment of generation of the command to initiate the 4–3 shift-down action and the moment of operations of the frictional coupling devices decreases with a decrease in the speed ratio of the torque converter 110. This arrangement permits the suitable drive torque to be transmitted to the vehicle drive wheels through the automatic transmission 78 in the process of the 4–3 shift-down action.

The engine output increase amount determining means 158 is also adapted to determine in step SS6 the engine output increase amount vdcst2 on the basis of the temperature THO of the working fluid of the automatic transmission 78, and according to the predetermined relationship of FIG. 7 between the engine output increase amount vdcst2 and the fluid temperature THO. This predetermined relationship is formulated such that the engine output increase amount vdcst2 increases with a decrease in the temperature THO. The rate of flow of the working fluid from the clutch C0 decreases with a decrease in the fluid temperature THO, and the time required for discharging the fluid from the clutch C0 increases with a decrease in the fluid temperature THO. That is, the shift-down action of the automatic transmission 78 tends to be delayed as the fluid temperature THO is lowered. Further, the power loss of the automatic transmission 78 tends to increase with a result of a decrease in the engine speed as the fluid temperature THO is lowered. In the present embodiment in which the engine output increase amount vdcst2 increases with the decrease in the fluid temperature THO, the engine output can be suitably increased at the time of the 4–3 shift-down action, so that the suitable drive force can be transmitted from the engine to the vehicle drive wheels in the process of the 4–3 shift-down action.

In the present embodiment, the shift control means 150 is adapted to determine whether the automatic transmission 78 should be shifted down from the fourth-speed position "4th" to the third-speed position "3rd". This determination is effected on the basis of the vehicle running speed V obtained from the output shaft speed NO of the automatic transmission 78 and the detected load (operating amount Ac of the accelerator pedal) currently acting on the engine, and according to the predetermined 4–3 shift-down boundary line of FIG. 2. The shift control means 150 is adapted to determine that the shift-down action should take place, if the output shaft speed NO exceeds the shift-down speed $NO_{4\ 3}$, determined by the 4–3 shift-down vehicle speed which is determined according to the 4–3 shift-down boundary line. Further, the engine output commanding means 164 (SS7) is adapted to generate the engine output increasing command when the output shaft speed NO falls below the threshold value which is the sum of the 4–3 shift-down speed $NO_{4\ 3}$ and the reference value KNO determined by the reference determining means 162 (SS5). The predetermined relationship of FIG. 8 used by the reference determining means 162 is formulated such that the reference value KNO increases with an increase in the deceleration value ΔNO of the vehicle. The engine output increasing command is kept applied to the engine output increasing means 160 to maintain the engine output at the increased value corresponding to the sum ($V_{ISC}$+vdcst), until the completion of the 4–3 shift-down action is detected in step SS2. In this arrangement, the reference value KNO is effective to compensate for a delay of the actual engine output increase by the engine output increasing means 160 with respect to the moment of generation of the engine output increasing command. This arrangement permits the engine output to be suitably increased when the 4–3 shift-down action takes place in response to the engine output increasing command generated by the engine output commanding means 164.

Further, the time measuring means 166 is adapted to measure in step SS8 the time lapse $T_{EL}$ after the engine output increase commanding means 164 has generated the engine output increasing command, that is, after the output shaft speed NO has been lowered below the threshold which is the sum of the 4–3 shift-down speed $NO_{4\ 3}$ and the reference value KNO. The shift-down action determining means 168 is adapted to command the shift control means 150 to effect the 4–3 shift-down action of the automatic transmission 78, when the time lapse $T_{EL}$ measured by the time measuring means 166 while the output of the engine 10 is kept increased by the engine output increasing means160 has exceeded the predetermined threshold $T_{EL1}$. In this respect, it is noted that the vehicle speed V is less likely to be lowered while the engine output is kept increased by the engine output increasing means 160, although the automatic transmission 78 should be shifted down. However, the present arrangement permits the shift-down action to take place the predetermined time after the moment of generation of the engine output increasing command, that is, after the vehicle speed has fallen down below a level at which the engine output increasing command is generated.

In the present vehicle control device, the clutch C0 can be engaged engaged in a relatively short time owing to the previous engagement of the one-way clutch F0, which takes place at a relatively early point of time in the process of the 4–3 shift-down action, since the engine output is increased by the amount vdcst which is determined by the engine output increase amount determining means 158 so that the suitable drive torque is transmitted from the engine 10 to the vehicle drive wheels through the automatic transmission 78 in the process of the 4–3 shift-down action. Therefore, when the automatic transmission 78 is shifted down from the fourth-speed position "4th" to the third-speed position "3rd" in response to an operation of the shift lever from the FORWARD-DRIVE position "D" to the SECOND position "2", the time between the moment of generation of the command to initiate the 4–3 shift-down action and the moment of initiation of the 4–3 shift-down action can be effectively reduced.

While the presently preferred embodiment of this invention has been described above by reference to the accompanying drawings, it is to be understood that the invention may be otherwise embodied.

Although the illustrated embodiment is arranged to temporarily increase the engine output upon the 4–3 shift-down action of the automatic transmission 78 while the vehicle is decelerating, the principle of this invention is equally applicable to the other shift-down actions of the automatic transmission 78 while the vehicle is running with the operating amount Ac of the accelerator pedal being substantially zero.

In the illustrated embodiment, the idling speed control means 152 is activated by the engine output increasing means 160 to increase the opening angle $V_{ISC}$ of the idling speed control valve (ISC) 38 by the suitably determined engine output increase amount vdcst, for thereby temporarily increasing the engine speed NE during the 4–3 shift-down action of the automatic transmission 78. However, a value corresponding to the engine output increase amount vdcst may be added to the target value of the engine idling speed NE as determined by the idling speed control means 152.

While the illustrated embodiment is arranged to use the operating amount Ac of the accelerator pedal as the load currently acting on the engine 10, the engine load may be represented by other parameters such as the opening angle θ of the throttle valve 20, intake air quantity Q and amount of injection of the fuel through the fuel injector valve 30.

In the illustrated embodiment, the opening angle θ of the throttle valve 20 is controlled by the throttle control computer 35 on the basis of the operating amount Ac of the accelerator pedal. However, the principle of this invention is applicable to a motor vehicle wherein the throttle valve 20 is mechanically linked with the accelerator pedal. Further, the automatic transmission 78 may be suitably modified in construction and the number of the operating positions.

Although the vehicle control apparatus of the illustrated embodiment includes the engine control computer 32, transmission control computer 34 and throttle control computer 35, the vehicle control apparatus may use single computer having the functions of the computers 32, 34, 35. The control routine illustrated in the flow chart of FIG. 9 may be executed by the engine control computer 32.

It is to be understood that the present invention may be embodied with various other changes, modifications and improvements, which may occur to those skilled in the art, without departing from the spirit and scope of the invention defined in the following claims.

What is claimed is:

1. An apparatus for controlling an automotive vehicle having an engine whose output is controllable independently of an operation of an accelerator pedal, and an automatic transmission having a plurality of operating positions which are selectively. established, said apparatus comprising:

engine output increase amount determining means for determining an amount of increase of an output of said engine upon a shift-down action of said automatic transmission during deceleration of the vehicle, on the basis of a deceleration value of the vehicle and according to a predetermined first relationship between said amount of increase of said output of the engine and said deceleration value of the vehicle; and engine output increasing means for temporarily increasing said output of the engine by said amount of increase determined by said engine output increase amount determining means, upon said shift-down action of the automatic transmission during deceleration of the vehicle.

2. An apparatus according to claim 1, wherein said predetermined first relationship used by said engine output increase amount determining means to determine said amount of increase of the output of the engine is formulated such that said amount of increase of the output of the engine increases with a decrease in said deceleration value of the vehicle.

3. An apparatus according to claim 1, wherein the automotive vehicle further has a fluid-operated power transmitting device disposed between said engine and said automatic transmission, and said engine output increase amount determining means determines said amount of increase of the output of the engine, also on the basis of a ratio of an input speed of said power transmitting device to an output speed of said power transmitting device, and according to a predetermined second relationship between said amount of increase of said output and said ratio, said predetermined second relationship being formulated such that said amount of increase of said output increases with a decrease in said ratio.

4. An apparatus according to claim 1, wherein said engine output increase amount determining means determines said amount of increase of the output of the engine, also on the basis of a temperature of a working fluid of said automatic transmission, and according to a predetermined second relationship between said amount of increase of said output and said temperature, said predetermined second relationship being formulated such that said amount of increase of said output increases with a decrease in said temperature of said working fluid.

5. An apparatus according to claim 1, further comprising:

engine output increase commanding means for generating an engine output increasing command for commanding said engine output increasing means to be operated for temporarily increasing the output of said engine; and reference determining means for determining a reference value used by said engine output increase commanding means to generate said engine output increasing command, said reference determining means determining said reference value on the basis of said deceleration value of the vehicle and according to a predetermined second relationship between said reference value and said deceleration value, and wherein said engine output increase commanding means generates said engine output increasing command at a first point of time before a second point of time at which it is determined that said shift-down action of said automatic transmission should take place, said first point of time being earlier than said second point of time by a time length corresponding to said reference value determined by said reference determining means.

6. An apparatus according to claim 5, further comprising shift control means for determining whether said shift-down action of said automatic transmission should take place, on the basis of a detected load currently acting on said engine and a detected running speed of the vehicle, and according to a predetermined third relationship between said load and said running speed, said shift control means determining that said shift-down action should take place, if said detected running speed exceeds a shift-down vehicle speed determined according to said predetermined third relationship, and wherein said engine output increase commanding means generates said engine output increasing command to activate said engine output increasing means, when said detected running speed falls below a threshold value which is a sum of said shift-down vehicle speed and said reference value determined by said reference determining means, said predetermined second relationship used by said reference determining means being formulated such that said reference value increases with an increase in said deceleration value of the vehicle.

7. An apparatus according to claim 6, further comprising shift-down action completion detecting means for detecting completion of said shift-down action of said automatic transmission, said shift-down action completion detecting means commanding said engine output increasing means to terminate an increase of the output of said engine when the completion of said shift-down action is detected.

8. An apparatus according to claim 5, further comprising:
time measuring means for measuring a time lapse after said engine output increase commanding means has generated said engine output increasing command;
shift control means for effecting said shift-down action of said automatic transmission; and
shift-down action determining means for commanding said shift control means for effecting said shift-down action, when said time lapse measured by said time measuring means while the output of said engine is kept increased by said engine output increasing means has exceeded a predetermined threshold.

* * * * *